Patented Oct. 17, 1939

2,176,080

UNITED STATES PATENT OFFICE 2,176,080

EGG COMPOSITION

Morris B. Katzman, Chicago, Ill., assignor to The Emulsol Corporation, Chicago, Ill., a corporation of Illinois No Drawing. Application January 8, 1938, Serial No. 184,032

25 Claims. (Cl. 99—113)

My invention relates to an improved egg and similar materials, particularly egg whites.

The principal object of my invention is the provision of egg material, particularly in the form of egg whites, having unusual utility in the preparation of non-shortening-containing baked flour products such as cakes, especially angel food cakes and cakes of the type thereof which are devoid or substantially devoid of shortening.

Another object is to improve egg material, particularly egg whites, by incorporating therein novel improving substances which modify the colloidal properties of the egg material and enhance the utility thereof for various purposes in the food and technical industries.

A further object is to enhance the foaming, beating or whipping properties of proteins or protein-like material of the general functional character of egg whites, and particularly egg whites, and to increase the stability of the resulting foam.

Other objects and features of the invention will appear as the description progresses.

Generaly speaking, whole eggs contain about ⅓ of yolks and ⅔ of whites. The yolk material contains about 50% moisture and 50% of solids, while the whites contain about 12½% solids and the rest moisture. The solid material of whole eggs is composed of various types of proteins having varying properties as well as somewhat smaller amounts of lecithin and fats. The whites contain a complex albumen substance with traces of sugar. In its normal state, the moisture of the egg is partially bound with the solids and is partially in a free state.

On freezing egg material, such as mixed eggs or yolks, and then thawing them out, clumping takes place and a portion of the liquid oozes out. The egg material at the same time suffers a change in its colloidal properties.

I have discovered that by adding certain substances, hereinafter described, to egg or similar material, particularly egg whites, the colloidal properties of the egg material are altered, the surface tension characteristics of the egg material are changed, and a product is produced having a modified viscosity, improved emulsifying value and, in particular, an unusual utility in the preparation of unbaked and baked flour products which are devoid or substantially devoid of shortening as, for example, angel food cakes and baked products of similar character. For example, the ordinary angel food cake is baked from a batter containing flour, beaten egg whites, sugar and usually an acidifying agent such as cream of tartar or the like, as well as the usual flavoring materials. When egg whites made in accordance with my present invention are employed in the cake batter, as indicated, the resulting cake is greatly improved with respect to grain, texture, "chewability", and volume, as well as in its general outer appearance. While the egg material of my invention has great advantage in improving baked flour products which are devoid of shortening such as, for example, angel food cakes, it is by no means limited to the use in this regard but is of advantage in many cases in which egg materials are employed for their emulsifying and colloidal properties, in the preparation of meringues, and the like.

The egg material of my present invention also has the advantage that, when frozen and kept in a frozen condition until ready for use and then thawed out, its viscosity will be modified and the separation of free moisture therefrom will be substantially reduced. If my invention is applied to egg whites, the product, after freezing and thawing, is generally less viscous but has a markedly enhanced utility over fresh egg whites, particularly in connection with the preparation of non-shortening-containing baked flour products.

The improving substances which I employ herein in accordance with my invention are, in general, possessed of at least two groups, one having a hydrophile function and the other having a lipophile function in the molecule. The hydrophile function is performed primarily by a poly-phosphoric acid group or groups, tending to give the molecule of which it is a part an affinity for aqueous materials. The lipophile group is any radical having an affinity for oleaginous material such as oils, fats, hydrocarbons and the like and may comprise radicals such as hydrocarbon radicals, acyl or alkyl groups derived from aliphatic or fatty acids or their corresponding alcohols, or the like. The hydrophile poly-phosphoric acid group or groups may be attached directly to the lipophile group or may be linked thereto through a polyhydroxy substance. In this latter case, the linkage between the polyhydroxy substance and the lipophile group or groups may be an ester or ether linkage.

Since there may be some question as to the exact chemical structure of the improving agents which I employ herein, I prefer to refer to, disclose and claim them as reaction products of poly-phosphoric acids with, in general, an alcohol or alcohols, the precise nature of the alcohols being set forth hereinafter.

The lipophile groups entering into the molecular structure of my improving substances may be of simple character as, for example, in reaction products of tetraphosphoric acid with straight chain alcohols such as hexyl alcohol, octyl alcohol, decyl alcohol, lauryl alcohol, and the like, or of branch chain alcohols such as 2-ethyl-hexanol-1, 2-butyl-octanol-1, and the like.

Others of the improving substances of my invention are reaction products of polyphosphoric acids with polyhydroxy substances, the hydrogen of at least one hydroxy group of the polyhydroxy substance being replaced by an alkyl or acyl radical containing preferably at least four carbon atoms and, more advantageously, between 8 and 18 carbon atoms. Specific examples of improving agents which I may employ in accordance with my invention are as follows:

1. The reaction product of tetraphosphoric acid with mono-olein, ammonium salt.
2. The reaction product of pyro-phosphoric acid with diethylene glycol mono-ricinoleate, sodium salt.
3. The reaction product of pyro-phosphoric acid with mono-laurin.
4. The reaction product of tetraphosphoric acid with mono-laurin, sodium salt.
5. The reaction product of pyro-phosphoric acid with mono-acetin, sodium salt.
6. The reaction product of tetraphosphoric acid with di-butyrin, sodium salt.
7. The reaction product of pyro-phosphoric acid with mono-cetyl ether of sorbitol.
8. The reaction product of pyro-phosphoric acid with ethylene glycol mono-stearate.
9. The reaction product of pyro-phosphoric acid with the ethyl ether of ethylene glycol.
10. The reaction product of pentaphosphoric acid with mono-caprylic acid ester of diethylene glycol.
11. The reaction product of pyro-phosphoric acid with mixed coconut oil fatty acid mono-esters of diethylene glycol, ammonium salt.
12. The reaction product of tetraphosphoric acid with mono-butyl ether of diethylene glycol, sodium salt.
13. The reaction product of pyro-phosphoric acid with sucrose mono-oleate, sodium salt.
14. The reaction product of pyro-phosphoric acid with mixed coconut oil fatty acid mono- or diglycerides or mixtures of mono- and diglycerides, ammonium salt.
15. The reaction product of tetraphosphoric acid with mono-oleic acid ester of diglycerol, sodium salt.
16. The reaction product of tetraphosphoric acid with the mono-octyl ether of glycerol, potassium salt.
17. The reaction product of pyro-phosphoric acid with di-caproin, sodium salt.
18. The reaction product of pyro-phosphoric acid with the mono-lauryl ether of diethylene glycol, sodium salt.
19. The reaction product of tetraphosphoric acid with the mono-melissic acid ester of mannitol, ammonium salt.
20. The reaction product of tetraphosphoric acid with the di-cetyl ether of sorbitol, potassium salt.
21. The reaction product of pyro-phosphoric acid with the di-stearic acid ester of triglycerol, potassium salt.
22. The reaction product of pyro-phosphoric acid with the mono-butyric acid ester of tartaric acid.
23. The reaction product of tetraphosphoric acid with monopropionic acid ester of mucic acid, sodium salt.
24. The reaction product of pyro-phosphoric acid with mono-palmitic acid ester of glycerol, ammonium salt.
25. The reaction product of tetraphosphoric acid with mono-myristic acid ester of glycerol, sodium salt.
26. The reaction product of penta-phosphoric acid with the di-oleic acid ester of diethylene glycol.
27. The reaction product of pyro-phosphoric acid with octyl alcohol.
28. The reaction product of pyro-phosphoric acid with lauryl alcohol.
29. The reaction product of pyro-phosphoric acid with mixed coconut oil fatty alcohols.
30. The reaction product of tetraphosphoric acid with octadecyl alcohol.
31. The reaction product of pyro-phosphoric acid with the mixture of alcohols derived from the reduction of sperm oil.
32. The reaction product of penta-phosphoric acid with ricinoleyl alcohol.
33. The reaction product of tetraphosphoric acid with butyl alcohol.
34. The reaction product of pyro-phosphoric acid with oleyl alcohol.

It will be seen that I may select many different types of compounds as lipophile groups for the preparation of the improving agents which I employ herein, particularly those having at least eight carbon atoms although, in some instances, the lipophile group or groups may contain as low as four carbon atoms and even less. For example, the following compounds may be utilized as sources of lipophile groups, and reaction products of poly-phosphoric acids therewith may be prepared by procedures described more fully hereinafter: butyl alcohol, amyl alcohol, hexyl alcohol, heptyl alcohol, octyl alcohol, nonyl alcohol, decyl alcohol, undecyl alcohol, lauryl alcohol, myristyl alcohol, cetyl alcohol, oleyl alcohol, linoleyl alcohol, stearyl acohol, ricinoleyl alcohol, palmitoleyl alcohol, melissyl alcohol, ceryl alcohol, carnaubyl alcohol, myricyl alcohol, branched chain octyl, decyl, dodecyl, tetradecyl, hexadecyl and octadecyl aliphatic alcohols as, for example, 2-ethyl hexanol-1, 2-n butyl octanol-1, 2-butyl tetradecanol-1, and, in general, the higher molecular weight saturated and unsaturated aliphatic straight chain and branched chain alcohols. Preferably, the alcohols which I utilize are those corresponding to the fatty acids occurring in triglyceride oils and fats of vegetable or animal origin, natural or hydrogenated, such as corn oil, cottonseed oil, sesame oil, coconut oil, palm kernel oil, sunflower seed oil, lard, tallow, soya bean oil and the like, those alcohols containing from 12 to 18 carbon atoms being preferred. I may also employ cyclo-aliphatic or ali-cyclic alcohols such as the sterols, as, for example, cholesterol, iso-cholesterol, phytosterol, sitosterol, hydro-aromatic alcohols such as abietol, and such unsaturated alcohols as linalool, citronellol, geraniol and the like. Also included within the class of alcohols which may be employed are such compounds as the hydroxy and alpha-hydroxy higher aliphatic and fatty acids as, for example, ricinoleic acid, alpha-hydroxy stearic acid, alpha-hydroxy lauric acid, di-hydroxy stearic acid, i-hydroxystearic acid, alpha-hydroxy palmitic acid, and the like, as well as esters of hydroxy-fatty acids, such as ethyl ricinoleate, castor oil, butyl alpha-hydroxystearate, cetyl hydroxystearate, and the like.

The term "alcohols", as employed herein, is intended to include alcohols which may or may not contain other groups such as carboxylic, halogen, sulphonic, sulphate, or other radicals. The alcohols obtainable by substituting alkyl or acyl radicals, preferably of high molecular weight, in place of the hydrogen of one or more hydroxy groups of polyhydroxy substances or polyhydric alcohols, it being understood that at least one hydroxy group attached to the nucleus of the polyhydroxy substance or polyhydric alcohol remains, are also within the scope of the alcohols from which the reaction products which I employ herein may be produced. As examples of such alcohols may be mentioned partially esterified or partially etherified sugars and sugar alcohols such as monolauric acid ester of sucrose, monostearic acid ester of dextrose, monopalmitic acid ester of mannitol, dicaproic acid ester of maltose, mono-octyl ether of sorbitol, monolauryl ether of pentaerythritol, monolauric acid ester of pentaerythritol, and the like; the monoglycerides and diglycerides, preferably of the higher fatty acids, as, for example, monolaurin, monomyristin, monostearin, distearin, diolein, dicaproin, di-myristin, mono-lauryl ether of glycerol, di-cetyl ether of glycerol, monostearic acid ester of diethylene glycol, monolauric acid ester of ethylene glycol, and the like.

It is, of course, obvious that the alcohols may be prepared in accordance with any desired method. For example, these alcohols may be prepared by the so-called Bouveault and Blanc method or, alternatively, by the reduction or catalytic reduction with hydrogen of natural or hydrogenated animal or vegetable fats and oils or fatty acids in accordance with well-known practices. Again, the alcohols may be derived from synthetic processes such as by the oxidation of hydrocarbons or they may be prepared by saponification of waxes and the like. Alternatively, they may be prepared by reduction of aldehydes or by the Grignard reaction. Still other methods known in the literature may likewise be employed if desired or deemed expedient. It is likewise apparent that mixtures of the foregoing or other alcohols may be utilized as, for example, the mixture of alcohols resulting from the hydrogenation of coconut oil or the free fatty acids of coconut oil. Lauryl alcohol comprises about 45% of the total alcohol mixture, the remaining alcohols running from $C_8$ to $C_{18}$. The reaction products of poly-phosphoric acids with these mixtures of alcohols function in substantially the identical manner as the reaction product of poly-phosphoric acids with substantially pure alcohols. Again, mixtures of alcohols such as are present in the so-called sperm oil alcohols, as well as those present in wool-fat, may equally efficaciously be utilized. Indeed, these higher molecular weight alcohols are generally, if, indeed, not almost invariably, offered on the market in the form of mixtures of different alcohols. If desired for any specific purpose, special fractions which predominate in a certain particular higher molecular weight alcohol may be utilized or, if so desired, the reaction products with poly-phosphoric acids may be prepared from a single, substantially pure alcohol. Since, obviously, for example, the reaction products of poly-phosphoric acids with lauryl alcohol are the same irrespective of how the alcohol is prepared, the reaction products thereof with poly-phosphoric acids are the same and function in like manner. Similarly, reaction products of poly-phosphoric acids with commercial mixtures of alcohols containing predominant amounts of, for example, lauryl alcohol function essentially identically the same as the reaction products of poly-phosphoric acids with substantially pure lauryl alcohol. It will be seen, therefore, that the source of the alcohols or higher molecular weight alcohols from which my reaction products are prepared is entirely immaterial.

So far as my improving substances are concerned which are derivatives of polyhydroxy substances, I may select many different types of compounds as lipophile groups which are to be linked to the polyhydroxy substances, principally compounds having lipophile radicals of relatively higher molecular weight. For example, the following materials may be utilized as sources of lipophile groups; carboxylic or fatty acids such as butyric acid, caprylic acid, caproic acid, capric acid, saturated and unsaturated higher molecular weight aliphatic acids such as the higher fatty acids containing at least 6 carbon atoms and including melissic acid, stearic acid, oleic acid, ricinoleic acid, linoleic acid, lauric acid, myristic acid, palmitic acid, mixed higher fatty acids derived from animal or vegetable sources, for example, lard, coconut oil, sesame oil, corn oil, cottonseed oil, sardine oil, partially or completely hydrogenated animal and vegetable oils such as those mentioned, fatty acids derived from various waxes such as beeswax, spermaceti, montan wax, and carnauba wax, hydroxy higher aliphatic or fatty acids such as 1-hydroxy-stearic acid, alpha hydroxy stearic acid, alpha hydroxy-palmitic acid, alpha hydroxy coconut oil fatty acids and similar hydroxy and alpha hydroxy higher fatty acids, carboxylic acids derived by oxidation and other methods from petroleum, hydroaromatic acids such as hydroxy benzoic acid, aromatic acids such as benzoic acid, naphthoic acid, and the like.

As indicated, instead of reacting the poly-phosphoric acids with esters of polyhydroxy substances, I may also effect the reaction of the poly-phosphoric acid with ethers of polyhydroxy substances. The esters as well as the ethers of the polyhydroxy substances which may be employed for reaction with poly-phosphoric acid to produce the reaction products which I utilize herein may be prepared in accordance with methods well known in the literature and which, therefore, need not be described herein.

The polyhydroxy substances which provide the linkage between the lipophile group or groups and the poly-phosphoric acid radical or radicals may be selected from a large class and include glycerol; glycols such as ethylene glycol, propylene glycol, trimethylene glycol, butylene glycol and the like; polyglycols such as diethylene glycol; polyglycerols such as diglycerol, triglycerol, tetraglycerol and the like including mixtures thereof; sugars such as dextrose, sucrose, xylose, galactose, fructose, maltose, mannose and the like; sugar alcohols such as arabitol, mannitol, sorbitol and dulcitol; and polyhydroxy carboxylic acids such as tartaric acid, mucic acid, saccharic acid, gluconic acid, glucuronic acid, gulonic acid, mannonic acid, trihydroxyglutaric acid, glyceric acid, carboxylic oxidation products of polyglycerols, other of similar character and hydroxy-ethyl and hydroxypropyl ether derivatives of the above, as for example:

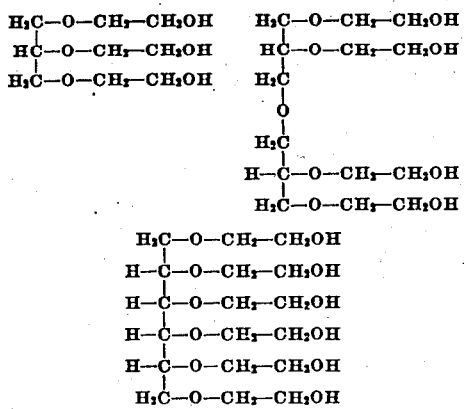

Procedural details of the methods by means of which the improving materials employed in my invention are prepared may be varied. The exact method employed should be determined primarily by considering the type of reacting constituents of the final substance to be produced. In all instances the compound reacted with the poly-phosphoric acid contains either at least one double bond or a reactive hydroxyl radical. The molal ratios of the reacting constituents may be varied to produce products having different properties and characteristics. A condensing agent and/or solvent may be added where required.

In order that others skilled in the art may even more fully understand how to prepare the improving materials which I employ herein in accordance with my invention, I shall describe various specific embodiments in detail. It is to be understood, however, that the following examples are given only by way of illustration and are not to be construed as limitative of the methods which may be employed in the production of the reaction products which I utilize herein. For example, it is evident that the proportions of reacting constituents, temperatures of reaction, time of reaction, and the like represent factors which may be varied, all within the skill of those versed in the art in the light of my teachings herein.

Example I

To 115 grams of pyrophosphoric acid at 90 degrees C. there is added with stirring 71 parts of mono stearin at 85 degrees C. The temperature of the mass rises to approximately 110 to 115 degrees C. after which it is allowed to cool. The resulting solid mass is mixed with a cold solution of 80 grams of sodium hydroxide dissolved in 400 cc. of water and the mixture is well stirred until all of the acid is neutralized. The solution is kept cold by means of an ice bath and also by adding small amounts of ice to the mixture. The resulting product is a thin paste.

Example II

To 69 parts by weight of tetraphosphoric acid, previously heated to 90 degrees C., 27 parts by weight of commercial octadecyl alcohol, also previously heated to 90 degrees C., were slowly added with vigorous stirring. The temperature rose to about 100 degrees C. and, at that temperature, the reaction product was a viscous mass, light brown in color and odorless.

Example III 26.8 parts by weight of oleic alcohol, previously heated to approximately 90 degrees C., were added slowly, with stirring, to 34.8 parts by weight of tetraphosphoric acid, also previously heated to 90 degrees C. The temperature rose to 125 degrees C. and, at this temperature, the reaction product was a viscous mass, medium brown in color. At room temperatures, the product became a heavy, nearly solid paste.

Example IV 27 parts by weight of octadecyl alcohol, previously heated to approximately 90 degrees C., were added slowly, with vigorous stirring, to 34.8 parts by weight of tetraphosphoric acid, also previously heated to approximately 90 degrees C. The temperature rose during the reaction to 100 degrees C. at which point 18.2 parts by weight of powdered mannitol were slowly added. The mass became thick and, upon stirring for several minutes, the reaction mass became much thinner. The product was then heated to 125 degrees C. for several minutes with vigorous stirring. In place of mannitol, other polyhydroxy substances such as dextrose could be employed.

Example V

A mixture of 2 and ½ parts of cottonseed oil, 2 and ½ parts of hydrogenated cottonseed oil having an iodin value of 68 to 70, and 5 parts of glycerin are heated to a temperature of 250 to 260 degrees C. for 2 hours using 0.005 part of sodium hydroxide as a catalyst. The reaction mixture is heated in a non-oxidizing atmosphere, such as carbon dioxide, and is continuously stirred in any suitable way during the entire reaction. After the completion of the reaction, the mass is permitted to stand and the excess glycerin, which constitutes the bottom layer, is drawn off from the desired monoglycerides which comprise the top layer.

To 36 parts of pyrophosphoric acid at room temperature (30 degrees C.) is added 77 parts of the above described monoglyceride at room temperature (30 degrees C.). The two components are then well mixed and the temperature rises to approximately 55 degrees C. The reacting mass is then mixed for about 30 minutes longer until the temperature thereof drops back to approximately 30 degrees C. The resulting product is a light brown plastic material. This is allowed to stand for about 15 hours and is then transferred to a mortar to which is slowly added 24 parts of sodium hydroxide dissolved in 90 parts of water. During the entire neutralization, the mass is kept at a temperature between 5 and 10 degrees C. with powdered dry ice. Upon each addition of alkali, the mass is intimately mixed. The final product is a cream colored somewhat limpid paste.

Example VI 21 parts by weight of commercial lauryl alcohol, previously heated to 90 degrees C., were slowly added with stirring to 69.6 parts by weight of tetraphosphoric acid, also previously heated to 90 degrees C. The temperature rose to 110 degrees C. The reaction product was a yellow paste, soluble in water, and had excellent foaming properties.

Example VII 42 parts by weight of commercial lauryl alcohol, previously heated to 90 degrees C., were slowly added, with stirring, to 69.6 parts by weight of tetraphosphoric acid. The temperature rose to 125 degrees C. and the reaction product, at room temperatures, was a yellow paste. 32 parts by weight of triethanolamine were dissolved in 60 parts by weight of water and 20 parts by weight of the above prepared reaction product were added with stirring at room temperature. The final solution was neutral to litmus, was clear and transparent, and had excellent foaming properties.

Example VIII

Approximately 25 parts of the coconut oil mono fatty acid ester of ethylene glycol is poured into about 54 parts of pyrophosphoric acid and the two are mixed together until homogeneous. When the temperature has ceased rising, the mass is heated to 90 degrees C. with stirring. If no further temperature rise is noted, the mass is permitted to cool and is then extracted with ether. The ether extract may be neutralized by passing into the same a gaseous stream of ammonia until a definite color change is noted.

In place of the coconut oil mono-fatty acid ester of ethylene glycol, I may use the coconut oil mono-fatty acid ester of diethylene glycol.

Example IX 62 parts by weight of diolein, previously heated to 90 degrees C., were added slowly with stirring to 34.8 parts by weight of tetraphosphoric acid. The temperature rose after a few minutes to 126 degrees C. At 120 degrees C. the reaction product was a red-brown liquid. On cooling, it became substantially thicker.

Example X

Approximately 77 parts of mono stearin (washed and dried) is heated to 90 degrees C. and is added to about 18 parts of pyrophosphoric acid also heated to the same temperature and the two are mixed until a homogeneous mass is obtained. The mass is stirred continuously until the heat of reaction ceases after which the mass is extracted with ether and neutralized and the ether evaporated in the same way as shown in Example VIII hereinabove.

Example XI 30.8 parts by weight of mixed coconut oil mono fatty acid esters of diethylene glycol, at a temperature of about 90 degrees C., were mixed with 34.8 parts by weight of tetraphosphoric acid, the ester being added to the acid as described in the above examples. The temperature rose to 136 degrees C., at which temperature the reaction product was a liquid of medium brown color. On cooling, it became a paste. This product was then neutralized in one case with triethanolamine and in another case with mono-ethanolamine. In each case, products resulted having excellent foaming properties.

Example XII

A mixture of 641 parts of myristic acid and 700 parts of glycerine is heated in an atmosphere of carbon dioxide at about 220 degrees C. for 2 hours, the moisture formed being permitted to escape. Upon cooling, a yield of 900 parts of mono myristin is obtained. 50 parts of the mono myristin is washed three times with water at 90 degrees C. and is dried by dissolving the washed substance in ether and adding enough anhydrous sodium sulphate to take up all of the moisture. The ether extract is then filtered and slightly evaporated. A crystalline substance comes out of the ether solution, the mass is filtered and is then thoroughly dried. Into 17 parts of pyrophosphoric acid at 90 degrees C. there are stirred 10 parts of the crystallized mono myristin at 90 degrees C. whereupon the temperature rises to approximately 100 degrees C. The mixture is then heated to 120 degrees C. for about 10 minutes and is then allowed to cool. The resulting solid mass is then extracted with ether, the extract is centrifuged and filtered and is then neutralized with a stream of gaseous ammonia. A white precipitate comes down which is filtered off and is then thoroughly dried. The resulting product is a white somewhat plastic solid.

While the illustrative examples listed hereinabove represent, in some cases, single substances, it must be understood that the invention is not limited to the use thereof. Indeed, in practice, it is frequently, if, indeed, not invariably, more convenient to prepare a mixture of the reaction products and to use such mixture. For example, I may prepare mixtures of monoglycerides and diglycerides of higher fatty acids by any convenient method, as, for example, by direct esterification of glycerol with higher fatty acids or by re-esterification of a triglyceride oil or fat with glycerol, preferably in the presence of a catalyst, and then react the resulting mixture with poly-phosphoric acids. Moreover, in place of pure monostearin, for example, I may utilize a commercial product which contains small proportions of mono-palmitin and mono-olein, or small proportions of the di-fatty acid esters of glycerol.

The polyhydroxy substances which provide the linkage between the lipophile group or groups and the hydrophile poly-phosphoric acid group or groups, in those of the reaction products which I employ herein which are derivatives of polyhydroxy substances, may be conveniently considered as falling into two groups. The first of these groups includes compounds containing less than four hydroxy groups and is exemplified by glycerin, glycols and polyglycols. The second group contains those substances which have more than three hydroxy groups, examples of which are the sugars and sugar alcohols, polyglycerols such as di- and tri-glycerol, etc. It will be understood that, in this class of the reaction products which I employ herein, there may be present one or more lipophile radicals and one or more hydrophile poly-phosphoric acid radicals attached to the polyhydroxy substance. Thus, for example, I may react one mol of a poly-phosphoric acid with one mol of the mono-oleic acid ester of glycerol or, alternatively, I may react two or more mols of a poly-phosphoric acid with one mol of the mono-oleic acid ester of glycerol. Similarly, I may react one or more mols of a poly-phosphoric acid with one mol of the di-stearic or other fatty acid esters of di- or tri-glycerol or the like. In a similar way, as described above, instead of the acyl derivatives of the polyhydroxy substances, I may employ the corresponding alkyl or ether derivatives.

While, in general, I react poly-phosphoric acids with a compound containing an alcoholic hydroxyl group, I may, in certain instances, utilize compounds having double bonds and no esterifiable hydroxy groups for reaction with poly-phosphoric acids. Illustrative of such compounds are, for example, tri-olein, mono-olein-distearine, corn oil, olive oil, cocoa butter, lard, and the like. In castor oil, for example, double bonds as well as free hydroxy groups are present.

I may utilize the reaction products as such or they may be neutralized with suitable anti-acid materials. In this connection, considerable latitude and modification may be exercised. In general, inorganic as well as organic anti-acid agents may be employed and the neutralization may be in whole or in part. Examples of inorganic and organic anti-acid agents which may be used satisfactorily are bicarbonates of the alkali metals, potassium hydroxide, potassium carbonate, metallic sodium, sodium hydroxide, sodium oxide, sodium carbonate, ammonium hydroxide, ammonia gas, potassium stearate, sodium stearate, non-toxic and innocuous organic anti-acid nitrogenous materials, as well as other anti-acid materials which serve to replace hydrogen of the poly-phosphoric acid group or groups by cations such as sodium, potassium, ammonium, etc., the term "cation" being used, in general, to include atoms or radicals which are regarded as bearing a positive charge. The reaction products may be neutralized to methyl orange, litmus, or phenolphthalein. As a general rule, if the salts of the reaction products are employed, it is preferred to utilize the sodium, potassium, ammonium or other soluble salts.

While I have described various examples of the preparation of the reaction products which I employ in accordance with my invention, it must be understood that the scope of the class of reaction products is by no means limited by these methods. Other convenient methods may be used. This also applies, and particularly so, to supplementary procedures of purification or isolation which lie strictly within the province of the skill of any qualified chemist whose procedures in each instance must be governed by the properties of the materials concerned and by the degree or character of the purity desired.

In addition to the pyrophosphoric acid and tetraphosphoric acid derivatives which I have specifically described herein, other poly-phosphoric acid derivatives may also be utilized as, for example, those prepared from poly-metaphosphoric acid, tri-, penta-, and hexa- and higher poly-phosphoric acids. Similarly, I may utilize mixtures of such poly-phosphoric acids as, for example, a mixture of pyro-phosphoric acid and tetra-phosphoric acid, in producing my improving agents in order to obtain reaction products having varying efficacies. In a case where, for example, equal parts of pyro-phosphoric acid and tetra-phosphoric acid are employed in producing the reaction products, the mean $P_2O_5$ content of the mixture of acids will correspond to that of tri-phosphoric acid.

The manner of incorporation of the improving substances used in accordance with my present invention may be effected in various ways. Those improving substances which are liquid at ordinary temperatures are readily incorporated into egg material by simple mixing, taking precautions that a uniform distribution of the improving material in the egg material is obtained. Those improving substances which are plastic or semi-solid may be emulsified with an aqueous material such as water to form a paste, and the paste incorporated into the egg material by a mechanical mixing operation. Certain advantages in distribution are obtained by adding the egg material to the paste with continuous stirring or rubbing, by the use of a colloid mill, or any suitable mixing apparatus. Those improving substances which are substantially solid at room temperatures may also be incorporated in egg material either by forming a paste or by grinding the improving substance together with a portion of the egg material, and subsequently dispersing the resulting product into the remainder of the egg material by suitable mixing apparatus.

The liquid emulsion of egg material and improving substance may be used immediately after mixing. The product, however, may be frozen and kept in a frozen condition below the minimum temperature of decomposition until ready for use. The product on thawing possesses valuable emulsifying properties.

When the improving substance is added to egg whites, which represents the most preferred aspect of my present invention, it is preferable to preliminarily make a paste of the improving substance with a relatively small amount of water and then add the egg whites thereto with constant stirring to provide a homogeneous mixture.

It will, of course, be appreciated that, for edible purposes, reaction products should be selected concerning the edibility of which no question can arise. It will likewise be understood that reaction products will be employed which are free or substantially free of odors and flavors which might be objectionable in food products should the reaction products be utilized in egg compositions which will be employed in products intended for human consumption. Those skilled in the art will be able readily to select suitable reaction products for specific purposes in the light of my teachings herein.

While the invention finds its greatest utility in connection with the treatment of egg whites, it is clear that it may, with advantage, be employed in the preparation of egg yolk products, whole or mixed egg products, and egg products containing various amounts of egg yolk and egg whites.

The egg products prepared in accordance with my invention may be utilized as such in liquid form or they may be dried or, as previously indicated, frozen. In the latter cases they will, of course, when employed in baked products or the like, be reconstituted or thawed out, as the case may be, in the same manner in which conventional dried or frozen egg materials are treated.

If desired, other known or commonly employed egg modifying materials may be incorporated into my novel egg compositions as, for example, sugars, salts such as sodium chloride, acids such as tartaric acid, citric acid and acetic acid, glycerin, hexahydric alcohols such as mannitol and sorbitol, hydrophilic colloids such as vegetable gums as, for example, gum arabic, gum tragacanth, gum karaya, agar, locust bean, pectin, Irish moss, other hydrophilic colloids such as gelatin, soy bean protein and other proteins, gelatinized starch, or suitable mixtures thereof, and the like.

Where there is a tendency for the egg product to be somewhat non-homogeneous, the use of the hydrophilic colloids may be of especial advantage to aid in the maintenance of homogeneity, particularly where the egg product is frozen and thawed. In such cases, the incorporation of from about 0.1% to 0.5% or 0.7%, or more or less as the circumstances may warrant, of the hydrophilic colloid into the egg material, based on the weight of the egg material, is satisfactory.

It will also be understood that the proportions of the improving substances or reaction products may vary within wide limits without departing from the spirit of my invention. Thus, for example, I may employ as little as 0.2%, based on the weight of the solids present in the egg material, or even less, and as much as 20%, based on the weight of the solids present in the egg material, or even more. The exact amount will naturally depend upon the potency of the particular reaction product employed, the specific use to which the product is to be placed, and the nature of the results sought. As a general rule, between 1% and 16%, based upon the weight of the solids present in the egg material, will be satisfactory for most cases.

While I have described my invention particularly in connection with the improvement of egg material, and especially egg whites, it must not be inferred that my novel teachings are necessarily so limited. Other protein or protein-like materials which function similarly to egg whites or egg albumen particularly with respect to incorporation of air by beating or similar mechanical treatment may be employed. Thus, for example, the protein ingredient may take the form of gelatin, de-fatted soya bean flour, proteinaceous extracts of soya bean, milk whey in either liquid, concentrated or desiccated form, and the like. For convenience, I consider these materials, including egg whites and egg albumen, as "beatable proteins."

The following examples are illustrative of egg products which are prepared in accordance with my invention:

Example A

To 0.9 pound of a reaction product of tetra-phosphoric acid with lauryl alcohol, prepared as described above, a small amount of water was added with constant stirring. Then a small amount of liquid egg whites was added thereto while still stirring and small portions of water and liquid egg whites were added alternately until 6 pounds of water and 75 pounds of liquid egg whites had been added, the resulting mixture becoming a homogeneous-appearing white mass. Then 225 pounds of liquid egg whites were added and the entire mass was well mixed to produce a uniform product having a generally cloudy appearance. If desired, the product can be packed into cans and frozen or maintained under refrigerated conditions.

Example B

Employing the same proportions of materials as described above in Example A but substituting half of the reaction product with an equal weight of the reaction product of tetra-phosphoric acid with octadecyl alcohol, the following mixing procedure was utilized: A small amount of the water was first slowly incorporated into the tetra-phosphoric acid reaction product, followed by a small quantity of the liquid egg whites. The resulting mass was then well macerated and the supernatant liquid was poured off the undissolved product. This procedure was repeated several times until all of the water and about 75 pounds of the liquid egg whites had been used to completely disperse the tetra-phosphoric acid reaction products. The resulting mixture was milky-white in color. The remaining 225 pounds of liquid egg whites were then added and mixed well, the final product having a generally milky or turbid appearance. If desired, it can be frozen or dried, preferably, after adjusting the acidity by means of sodium bicarbonate, sodium carbonate, sodium hydroxide, or other anti-acid substances.

Example C

Using the same proportions of ingredients and the same mixing procedure as in Example B above, the reaction product in this case being that resulting from interacting pyro-phosphoric acid with octadecyl alcohol, I obtained a product similar to that of Example B.

Example D

One pound of the sodium salt of the reaction product of pyrophosphoric acid with monolaurin was dispersed in three hundred pounds of liquid egg whites, as described hereinabove, and packed into cans and frozen at −12 degrees F. It was maintained at about −5 degrees F. until ready for use.

Example E

Five pounds of the reaction product of one mol of dimyristin and two mols of pyro-phosphoric acid, prepared in accordance with the methods described above, were incorporated into two hundred and seventy-five pounds of liquid egg whites, in a similar manner to that described above, and packed into thirty-pound containers and frozen, as described in Example D. Alternatively, the product may be dried, preferably after converting the reaction product to a salt, preferably a sodium salt.

Example F

One pound of the reaction product of one mol of coconut oil mixed fatty alcohols (consisting predominantly of lauryl alcohol) with two mols of pyro-phosphoric acid, produced as described above, and one pound of gum tragacanth were made into an aqueous paste with six pounds of water and then three hundred pounds of liquid egg whites were mixed therewith following the mixing procedure described above. The resulting product was then packed into cans and frozen.

Example G

Into about one hundred and fifty pounds of mixed whole eggs, about four pounds of the reaction product of Example III were incorporated with constant stirring to produce a homogeneous mixture. The resulting product may be packed into cans and refrigerated or frozen and maintained in such a condition until ready for use.

Example H

About one pound of the reaction product of one mol of monostearin with two mols of pyro-phosphoric acid was mixed with an amount of egg yolk material to form a pasty mass, the latter then being incorporated into fifty pounds of egg yolk to form a homogeneous mixture. The product was packed into cans and frozen.

Example I

About one pound of the reaction product of one mol of monolaurin with two mols of tetra-phosphoric acid was mixed with eight pounds of egg white to form a pasty mass, the latter then being incorporated into two hundred and ninety pounds of egg white to form a homogeneous mixture. The product was packed into cans and frozen.

For the purpose of producing a dried albumen product, I prefer, as indicated above, to disperse the improving agent, ordinarily in the form of a sodium, potassium or ammonium or similarly soluble or dispersible salt, in the liquid egg whites or the like prior to drying. Alternatively, although not quite so satisfactory, the improving agent, in the form of a salt and in a finely divided state, may be admixed with the previously dried egg whites or the like.

As illustrative of the unusual utility of the egg products of my invention, reference may be had to the use of the same in an angle food cake.

A standard angel food cake, for comparison purposes, was first prepared from the following formula, expressed in parts by weight, in this instance, grams:

| | |
|---|---|
| Egg whites | 600.0 |
| Finely granulated sugar | 600.0 |
| Cream of tartar | 6.5 |
| Cake flour | 218.0 |
| Salt | 3.5 |
| Vanilla | 6.0 |

The egg whites were preliminarily whipped or beaten for one minute. A sifted mixture of the cream of tartar, salt and 150 grams of sugar was then added to the beaten egg whites in the space of about a minute and the mass was whipped for an additional eleven minutes. The remaining 450 grams of sugar and the flour, sifted three times, were then added, with the beater running at low speed, gradually over a period of one-half minute, and the mass was then mixed for another one-half minute. The vanilla was then mixed in and the cake was baked in an electric oven at a temperature of 350 degrees F. for a period of 28 minutes.

Illustrative of the use of the egg material of my invention, the same procedure described hereinabove was followed with the exception that, instead of using ordinary liquid egg whites, an egg white product containing 600 grams of normal liquid egg whites admixed with 1.8 grams of a reaction product of 1 mol of monostearin with two mols of pyro-phosphoric acid was employed, the reaction product being previously macerated in a mortar with 12 cc. of water and the resulting paste incorporated into the liquid egg whites.

The contrast between the standard cake and the cake produced when employing the egg material of my invention was marked. The outer appearance of the standard cake and the color of the crumb thereof were distinctly inferior to the other cake. The volume of the standard cake was 1055 cc. as against 1130 cc. for the other cake. Furthermore, the grain, texture and "chewability" of the standard cake were definitely inferior to the other cake.

As previously indicated, an important aspect of my invention is the improvement of the character and stability of the foam produced from egg whites or similar beatable proteins. The following tests point out clearly the nature of this improvement. In a blank carried out by adding 43 grams of a certain powdered egg albumen to 430 cc. of water, the powdered egg albumen being added slowly to the water and stirred for 5 minutes at low speed, the weight of a given volume of the beaten egg albumen, measured in a funnel, was 48 grams, the height of the foam in the beating or mixing bowl being 7 inches. The drip from the funnel in a 30 minute test was 4 cc. and the character of the foam was fair, leaning towards good. By adding 1 gram of a reaction product of 1 mol of lauryl alcohol with 2 mols of pyro-phosphoric acid, the weight of the same volume of the foam as tested in the blank was 42 grams, the height in the mixing bowl was 7½ inches, the drip was only 1½ cc. and the general appearance and character of the foam was excellent. In a similar test, using the reaction product of the immediately preceding example but neutralized with NH₃, the weight of the foam was 41.9 grams, the height in the bowl 7½ inches, the drip only 1½ cc. and the appearance of the foam was excellent. By way of further explanation, it will be appreciated that the decreased weight of the foam of the treated albumen shows that its specific gravity is lower than that of the blank. The height of the foam in the beating bowl registers the enhancement of the foaming properties and is also an index of the specific gravity of the foam. The drip test serves to characterize the stability of the foam, it being understood that the greater the volume of the drip per unit of time the less the stability. It will be seen at once, therefore, from the illustrative examples given herein, that the improvements described are of substantial magnitude and importance.

By the term "reaction product of poly-phosphoric acid with * * *", as used herein and in the appended claims, I intend to include not only the unneutralized reaction product but also the product either partially or completely neutralized with suitable anti-acid materials as previously described.

The term "higher", as used herein and in the claims with reference to higher molecular weight alcohols or in similar expressions, will be understood to mean at least six carbon atoms, unless otherwise specifically stated.

This application is a continuation-in-part of my application, Serial No. 174,661, filed November 15, 1937.

What I claim as new and desire to protect by Letters Patent of the United States is:

1. A product consisting essentially of egg material and containing a proportion of a reaction product of a poly-phosphoric acid with an alcohol.

2. A product consisting essentially of egg material and containing a proportion of a reaction product of a poly-phosphoric acid with an alcohol corresponding to the alcohols derivable from triglyceride oils, fats, waxes, and higher fatty acids.

3. A product consisting essentially of egg material and containing a proportion of a reaction product of a poly-phosphoric acid with an alcohol in the form of a polyhydroxy substance wherein the hydrogen of at least one hydroxy group of said polyhydroxy substance is replaced by a radical selected from the group consisting of alkyl and acyl radicals.

4. Egg material selected from the class consisting of liquid egg whites, dried egg whites and frozen egg whites and containing a proportion of a reaction product of a poly-phosphoric acid with an alcohol.

5. Egg material selected from the class consisting of liquid egg whites, dried egg whites and frozen egg whites and containing a proportion of a reaction product of a poly-phosphoric acid with an aliphatic alcohol containing at least six carbon atoms.

6. Egg material selected from the class consisting of liquid egg whites, dried egg whites and frozen egg whites and containing a proportion of a reaction product of a poly-phosphoric acid with a straight chain aliphatic alcohol containing from 12 to 18 carbon atoms.

7. Egg material selected from the class consisting of liquid egg whites, dried egg whites and frozen egg whites and containing a proportion of a reaction product of pyro-phosphoric acid with an alcohol corresponding to the alcohols derivable from triglyceride oils, fats, waxes, and higher fatty acids.

8. Egg material selected from the class consisting of liquid egg whites, dried egg whites and frozen egg whites, and containing a proportion of a reaction product of pyro-phosphoric acid with lauryl alcohol.

9. Egg material selected from the class consisting of liquid egg whites, dried egg whites and frozen egg whites, and containing a proportion of a reaction product of a poly-phosphoric acid with monolaurin.

10. Egg material selected from the class consisting of liquid egg whites, dried egg whites and frozen egg whites, and containing a proportion of a reaction product of pyrophosphoric acid with an alcohol in the form of a polyhydroxy substance wherein the hydrogen of at least one hydroxy group of said polyhydroxy substance is replaced by a radical selected from the group consisting of alkyl and acyl radicals.

11. Egg material selected from the class consisting of liquid egg whites, dried egg whites and frozen egg whites, and containing a proportion of a reaction product of a polyphosphoric acid with an alcohol in the form of an aliphatic polyhydroxy substance wherein the hydrogen of at least one hydroxy group of the aliphatic polyhydroxy substance is replaced by a higher molecular weight acyl radical, said polyhydroxy substance being a member of the group consisting of glycerol, glycols, polyglycerols, polyglycols, sugars, sugar alcohols, and hydroxycarboxylic acids.

12. Egg material selected from the class consisting of liquid egg whites, dried egg whites and frozen egg whites, and containing a proportion of a reaction product of pyrophosphoric acid with an alcohol in the form of an aliphatic polyhydric alcohol wherein at least one hydroxy group of the alcohol has its hydrogen replaced by an acyl group containing at least four carbon atoms.

13. Egg material selected from the class consisting of liquid egg whites, dried egg whites and frozen egg whites, and containing a proportion of a reaction product of pyrophosphoric acid with an alcohol in the form of a fatty acid monoglyceride, the fatty acid radical containing at least four and preferably from twelve to eighteen carbon atoms.

14. Egg material in accordance with claim 4, wherein the reaction product is present in proportions of the order of about 1% to 16%, based upon the weight of the solids present in the egg whites.

15. Egg material in accordance with claim 5, wherein the reaction product is present in proportions of the order of about 1% to 16%, based upon the weight of the solids present in the egg whites.

16. Egg material in accordance with claim 7, wherein the reaction product is present in proportions of the order of about 1% to 16%, based upon the weight of the solids present in the egg whites.

17. Egg material in accordance with claim 9, wherein the reaction product is present in proportions of the order of about 1% to 16%, based upon the weight of the solids present in the egg whites.

18. Egg material in accordance with claim 10, wherein the reaction product is present in proportions of the order of about 1% to 16%, based upon the weight of the solids present in the egg whites.

19. Egg material in accordance with claim 13, wherein the reaction product is present in proportions of the order of about 1% to 16%, based upon the weight of the solids present in the egg whites.

20. Egg material selected from the class consisting of liquid egg whites, dried egg whites and frozen egg whites, and containing a proportion of a reaction product of a poly-phosphoric acid with coconut oil mixed fatty alcohols.

21. A product consisting essentially of beatable protein and containing a proportion of a reaction product of a poly-phosphoric acid with an alcohol.

22. A product consisting essentially of beatable protein and containing a proportion of a reaction product of a poly-phosphoric acid with a lipophile material containing a member selected from the group consisting of at least one hydroxy group and at least one double bond.

23. Egg material selected from the class consisting of liquid egg whites, dried egg whites and frozen egg whites, and containing a proportion of a reaction product of polyphosphoric acid with a lipophile material containing a member selected from the group consisting of at least one hydroxy group and at least one double bond.

24. The product of claim 4, containing a proportion of an added hydrophilic colloid.

25. The product of claim 6, containing a proportion of an added hydrophilic colloid.

MORRIS B. KATZMAN.